No. 671,947. Patented Apr. 16, 1901.
H. L. ARNOLD.
MECHANICAL MOVEMENT.
(Application filed June 11, 1900.)
(No Model.) 5 Sheets—Sheet 4.

Witnesses:
F. N. Haviland
R. W. Pitman

Inventor,
Horace L. Arnold
By his Attorney.
F. H. Richards.

No. 671,947. Patented Apr. 16, 1901.
H. L. ARNOLD.
MECHANICAL MOVEMENT.
(Application filed June 11, 1900.)
(No Model.) 5 Sheets—Sheet 5.

Witnesses:

Inventor;
Horace L. Arnold,
By his Attorney.

UNITED STATES PATENT OFFICE.

HORACE L. ARNOLD, OF BROOKLYN, NEW YORK, ASSIGNOR TO JOHN A. HILL, OF NEW YORK, N. Y.

MECHANICAL MOVEMENT.

SPECIFICATION forming part of Letters Patent No. 671,947, dated April 16, 1901.

Application filed June 11, 1900. Serial No. 19,799. (No model.)

*To all whom it may concern:*

Be it known that I, HORACE L. ARNOLD, a citizen of the United States, residing in the borough of Brooklyn, in the county of Kings and State of New York, have invented certain new and useful Improvements in Mechanical Movements, of which the following is a specification.

My invention relates to mechanical movements, and particularly to a compound hand-lever and mechanism controlled thereby, whereby various movements of parts with which the lever is to be connected may be obtained without removing the hand from said lever.

Primarily, the object of the invention is the provision of a single-grip manually-controlled lever having hand-operated parts at one end and a fulcrum in a frame or casing at the other end of such construction that the operator may produce a number of different movements of the various parts of which the lever is composed and so that any of the functions of this compound hand-lever may be exercised without varying the adjustment of any of the parts controlled by the hand-lever, excepting only the single part it is desired at the time to operate. Such a compound lever and its connections may be used for different purposes and made to take the place of several different levers ordinarily employed to effect adjustments in machines, and in the compact form of the invention shown the lever may be moved forward and backward and laterally in both directions and in each of said movements be made to actuate a single part of a machine with which it may be connected.

A further object of the invention is the provision of means carried by the lever for imparting movement to a connector, which may be attached to a slide, rack, or other device.

A further object of the invention is the provision of racks actuated by connectors within the lever, one of said racks being in engagement with a sector and another of said racks with another sector, each connector for operating the rack being under independent control of the operator.

A further object of the invention is the provision of sectors actuated by means carried by the lever, each sector controlling the movements of a slide or other device which may be connected to any part of a machine it is desired to operate.

Referring to the accompanying drawings.

Figure 11:
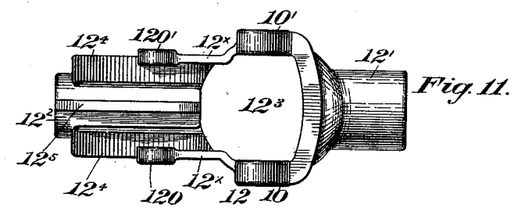
Figs. 11, 12, and 13 are respectively plan, side, and end elevations of the casing or frame to which the various parts are connected.
Figure 12:
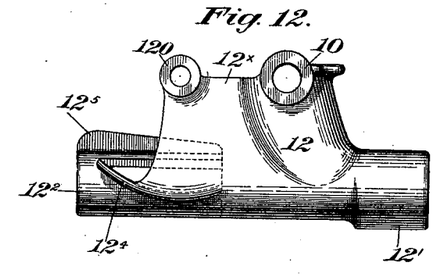
Figure 13:
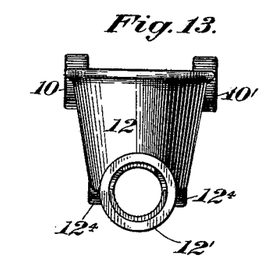
Figure 14:
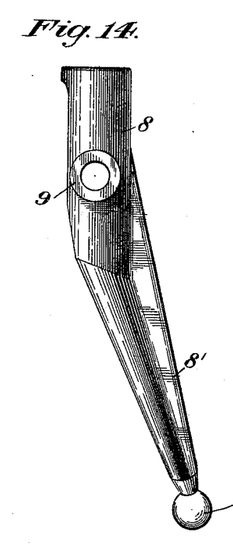
Figs. 14 and 15 are respectively side and front elevations of the lower end of the lever part of my improved mechanical movement.
Figure 15:
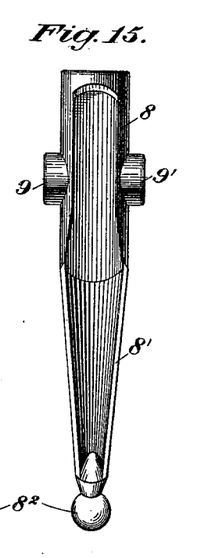
Figure 16:
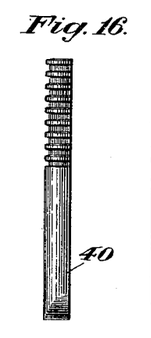
Figs. 16 and 17 are respectively edge and side views of one of the parti-cylindrical racks employed in connection with my invention.
Figure 17:
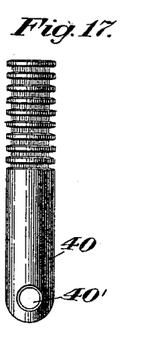

Referring to the drawings the numeral 5 designates in a general way the lever part of my improved mechanical movement, and in the exemplification given this consists of a tubular lever-arm 6, carrying at its free extremity a handle 7. At its other extremity the tubular lever-arm 6 is inserted in a hollow part, constituting an extension 8 of the lever-arm, which extension is formed with a deflected or inclined portion 8', which may terminate in a ball-shaped end $8^2$ or in any other form suitable for transferring motion suitable to the needs of the machine with which the lever may be connected. Located intermediate the ends of extension 8 are hollow trunnions 9 9', which are journaled on pins 90 91, threaded into seats 10 10', formed in a hollow frame or casing 12, mounted for rocking movement in the frame 13 of a machine. This frame 12 is of peculiar construction, and, as shown more clearly in Figs. 11, 12, and 13, consists of a body having tubular ends 12' $12^2$, a central opening $12^3$ of considerable area to receive and permit the various movements of the lever-arm 6 and its extension 8 8', and sides $12^\times$, in which the seats 10 10' are formed. This hollow frame or casing (which is preferably a single casting) may be provided with reinforcing-ribs $12^4$ $12^5$ to afford strength and rigidity where needed.

In the tubular end 12' of the hollow frame 12 a tubular (or it may be solid) shaft 14 is secured, and this shaft will be connected to any part of a machine it is desired to operate by a swinging movement of the compound lever 5 in a line transverse to its longitudinal axis, said shaft or rod 14 turning in a bearing 13' of frame 13 (see Fig. 1) and being at its end remote from said bearing connected, as above stated, to the element of the machine to be moved or adjusted—for instance, a belt-shifter which it may be desired to shift or a gear or wheel which it is desired to move to an angular position.

Figures 1, 2, 3, 4, 5:
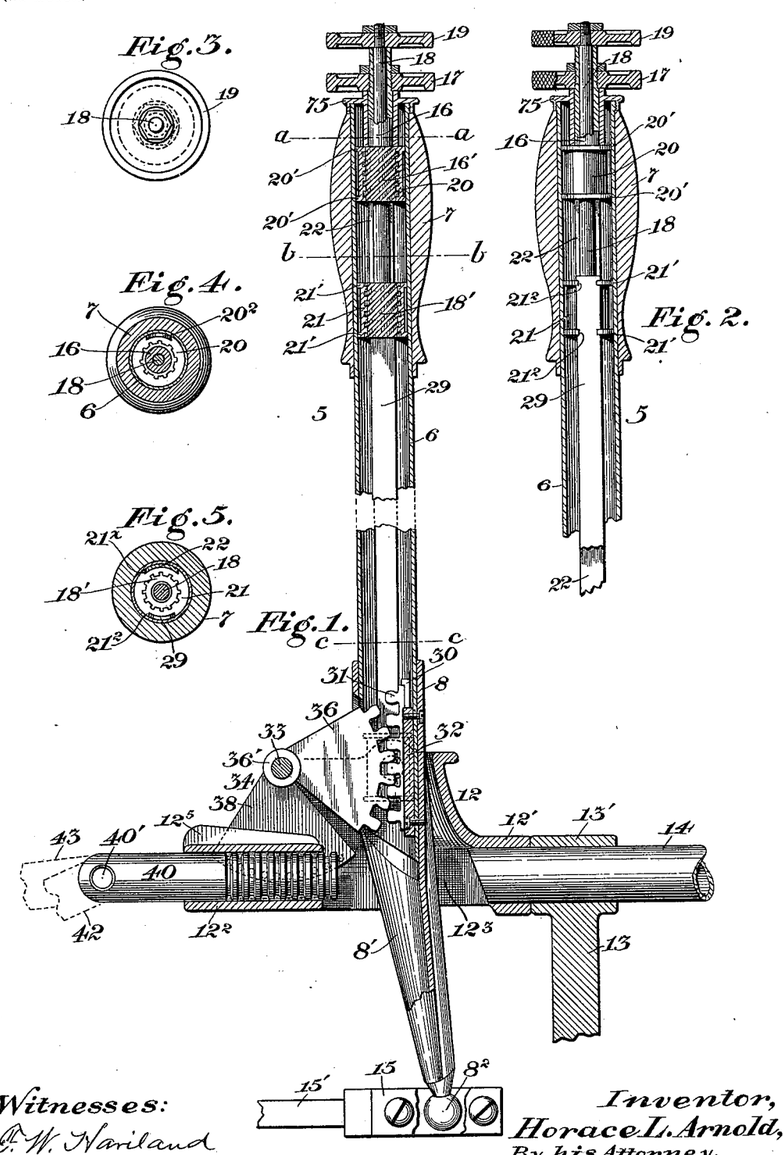
Figure 1 is a longitudinal vertical section of my invention, parts being shown in elevation.
Fig. 2 is a similar view with a part broken away, the nuts shown in Fig. 1 in section appearing in elevation in this figure.
Fig. 3 is a plan view of the upper part of the lever.
Fig. 4 is a section on line *a a*, Fig. 1, looking downward.
Fig. 5 is a section on line *b b*, Fig. 1, also looking downward.
Figures 6, 29, 31:
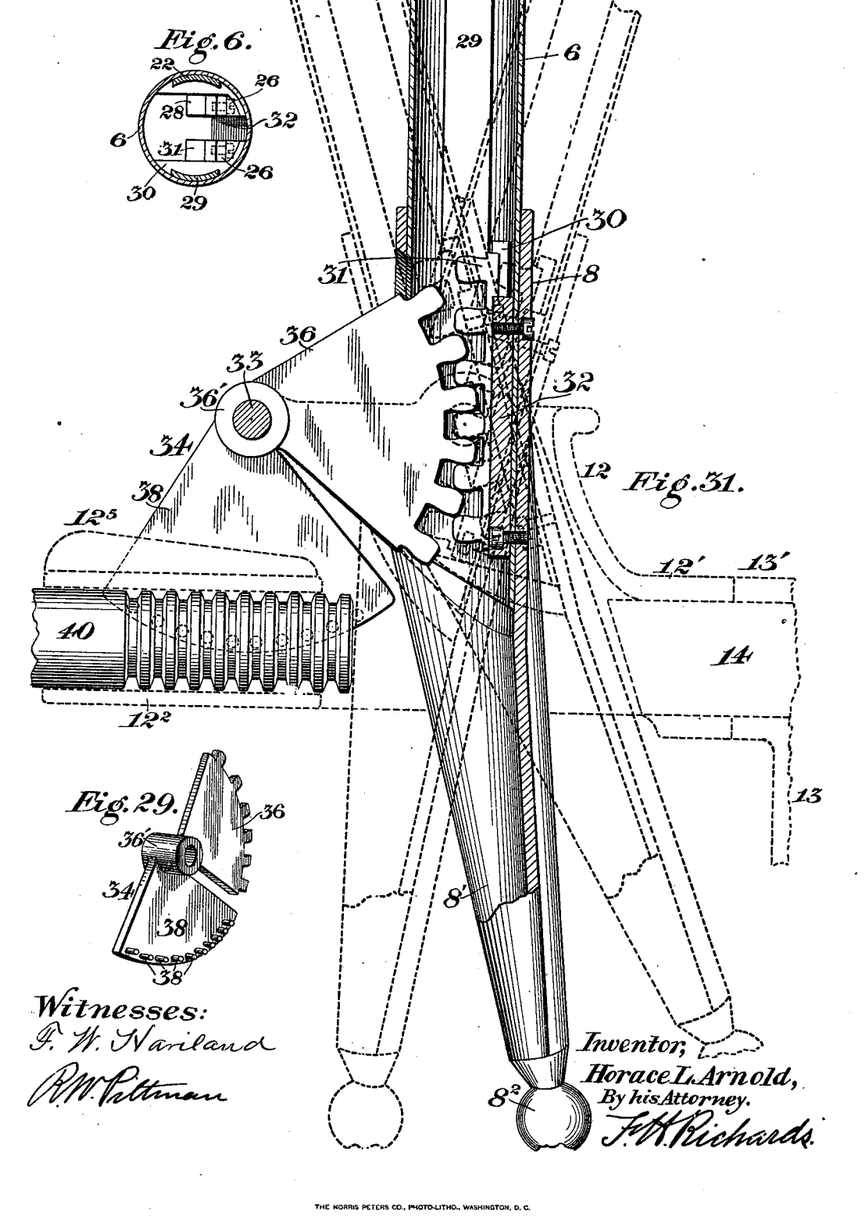
Fig. 6 is a section on line *c c*, Fig. 1.
Fig. 29 is a perspective view of one of the combined gear and pin wheel sectors.
Fig. 31 is a sectional view, on an enlarged scale, showing by dotted lines the manner in which the racks carried by the lever operate without actuating the sectors when the lever is swung back and forth on its pivot, the lever being illustrated by full lines in its mid-position and by dotted lines in each of its extreme movements on the side of said mid-position.

At its rounded or ball-shaped end $8^2$, if provided, the compound lever may be connected with a bearing 15, shaped to receive it, from which may project a rod or link 15', which as the lever is swung back and forth on its pivot may be utilized to shift a clutch on a shaft to stop, start, or reverse the machine. In Fig. 1 the lever is represented in its mid or neutral position, and when moved on its trunnions it will actuate the connection 15' either forward or backward, according to the direction in which the lever is shifted, as shown in Figs. 1 and 31. In virtue of the universal connection $8^2$ at the extremity of the lever (when employed) it may be oscillated in a direction transverse to that just described without operating the bearing 15 and rod 15', the ball-shaped end $8^2$ simply rocking in its seat in said bearing. While the lever 5 is shown pivoted to the frame 12, yet is is distinctly to be understood that the invention is not limited to this feature, for, as is obvious, the frame may be rocked and other parts (hereinafter specified) carried by said frame operated without pivoting the lever to the frame.

Located within the hollow lever-arm 6 are devices which will now be described and which may be utilized to impart independent movements to other elements of a machine when desired, and these devices are shown assembled in Figs. 1 and 2 and 7 to 10, inclusive, and are illustrated detached on Sheet 4 of the drawings.

Mounted within the tubular lever-arm 6 is a short tubular shaft 16, having an enlarged end 16' bored out for lightness, and upon this enlargement a screw-thread, preferably multi-threaded and of about one-inch pitch, is formed, and to the opposite end of this shaft a disk or wheel 17, preferably having a milled edge, is attached, the construction being such that the disk may readily be turned by the thumb or finger of the operator without removal of his hand from the handle 7. Passing through this tubular shaft 16 and its threaded portion 16' is a longer shaft 18, also having one of its ends enlarged and formed with a threaded portion 18', similar to that of shaft 16, and at its other end this shaft is provided with a thumb or finger actuated disk 19, similar to the disk 17, one of said disks being located a short distance above the other disk, so that both are within easy reach of the fingers of the operator, who can readily push either of them around without withdrawing the hand from the lever. These shafts 16 and 18 and their connections are retained within the lever 6 by a screw-cap 75, threaded to the upper end of said lever. Threaded portion 16' engages a nut 20, shown as a cylinder having flanges 20', which are cut away or grooved on one side only at $20^2$, for a purpose hereinafter stated, and the threaded portion 18' of shaft 18 engages a nut 21, flanged at the ends at 21' and cut away or grooved on both sides at $21^2$ and $21^\times$ to subserve purposes hereinafter described.

Figure 10:
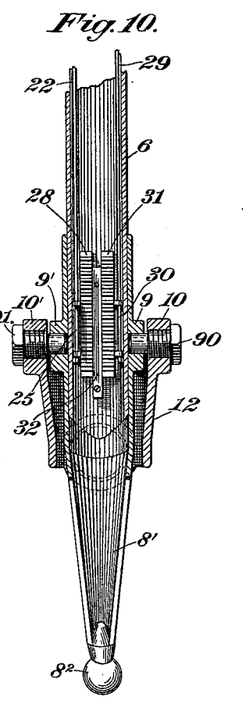
Fig. 10 is a section on line *f f*, Fig. 7.

Seated within the grooves $20^2$ of nut 20 is a connector, shown as a concave bar or plate 22, cut away at 22' at its edges to form upper and lower sets of shoulders $22^2$, and the narrower portion of said connector is inserted in said grooves $20^2$, the shoulders $22^2$ resting against the flanges 20' 20' on both sides of the grooves $20^2$, and thus interlocking the parts, the body of the connector 22 being kept within said grooves $20^2$ by the inner wall of the tubular lever-arm 6 when the parts are assembled. (See Figs. 1, 2, 4, and 5.) At its lower end the connector 22 is cut away in a similar manner to form a narrow portion $22^3$ and shoulders $22^4$, said narrow portion $22^3$ being fitted within grooves 23 in the flanges 24 of a particylindrical rack-carrier 25 of peculiar construction, (see Figs. 26, 27, and 28,) said carrier having formed, preferably integral therewith, a bar 26, having a seat 27, in which a rack 28, having relatively long teeth with slightly-undercurved flanks to afford clearance, is placed and secured, preferably by screws, as shown in Fig. 26, this bar 26 being located at one corner of the rack-carrier (see Fig. 27) and the curved outer wall of the carrier fitting within the tubular part 6 of the compound lever, which is inserted within the socket 8, as shown in Fig. 10.

Connected with the nut 21 is a connector, shown as a concave bar or plate 29 of the same shape as connector 22 and constructed with narrow parts $29'$, having shoulders $29^2$ $29^3$, the upper end of said connector being fitted within the groove $21^2$ in the nut 21, and this connector, like the one 22, extends down within the tubular part 6 of the handle where said part 6 enters the socket part 8, and it is also connected to a rack-carrier 30, having a rack 31, also having relatively long teeth with slightly-undercurved flanks and of the same construction as the rack-carrier 25, both rack-carriers 25 30 being separated from each other within the part 6 by a guide block or chock 32, as seen in Figs. 1 and 6, and the curved inner wall of said part 6 serving to engage with the curved lower portions of the connectors 22 and 29 and to hold said bars within the grooves of the rack-carriers 25 and 30. The trunnions of the compound lever 6 8 are fitted upon journals 90 91, preferably threaded within the seats 10 $10'$, and they serve as pivots for supporting the lever, so that it may be swung back and forth in an arc at right angles to said pivots, as shown in Figs. 1, 10, and 31.

Figures 18, 19, 20, 21, 22, 23, 24, 26, 27, 28, 30:
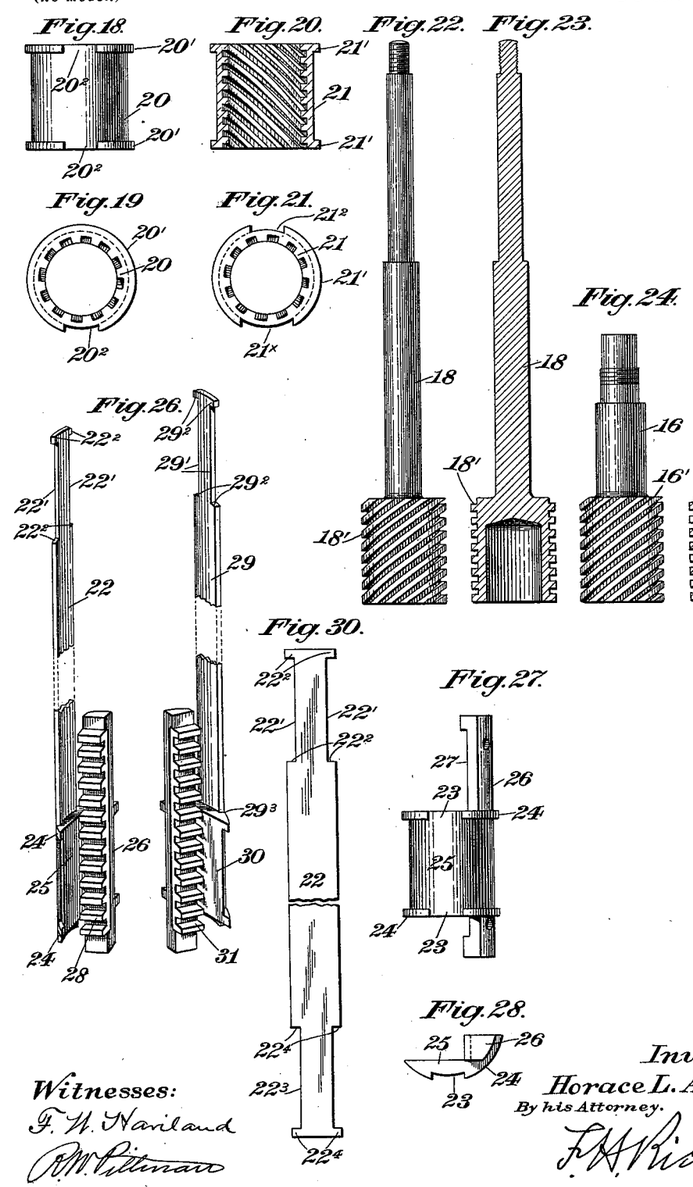
Figs. 18 and 19 are respectively side and plan views of one of the nuts employed with my improvement.
Figs. 20 and 21 are respectively a vertical section and a plan view of another nut employed.
Figs. 22 and 23 are respectively side and sectional views of the shaft having a screw or spiral employed with the nut shown in Figs. 20 and 21.
Figs. 24 and 25 are side and sectional views of the shaft having a screw or spiral employed with the nut illustrated in Figs. 18 and 19.
Fig. 26 is a perspective view of racks and their connections employed within the tubular lever of my mechanical movement.
Figs. 27 and 28 are respectively side and top views of one of the carriers for the racks.
Fig. 30 is a perspective view of one of the devices for connecting the nuts and the rack-carriers.
Figure 25:
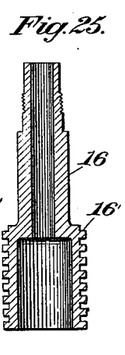

As will be noticed by reference to Figs. 5 and 6, the concave connectors 22 29 are located diametrically opposite each other in tubular lever-arm 6, and to avoid interference of the connector 22 with the lower nut 21 said nut is provided with a wide groove $21^X$, adapted to receive said connector, as shown in Figs. 5 and 21, and at the same time permit of its free longitudinal movement. Any suitable connectors may be substituted for those above described, and the grooves or seats in the nuts may be varied without departure from my invention.

Figure 8:
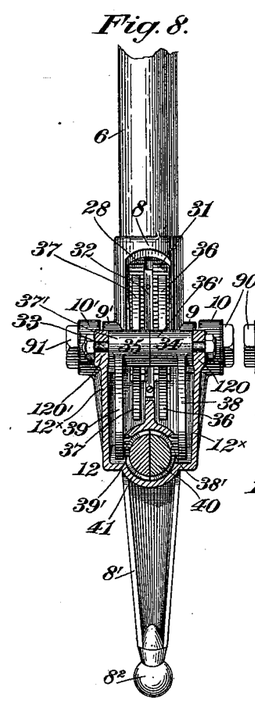
Fig. 8 is a section on line *d d*, Fig. 7.
Figure 9:
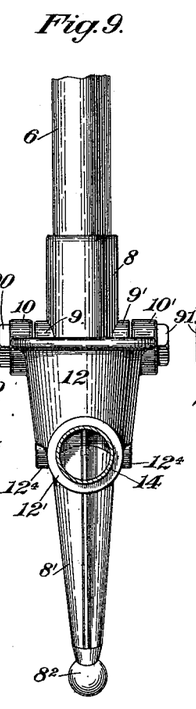
Fig. 9 is a section on line *e e*, Fig. 7, looking in the direction of the arrow.

Located in line with the seats 10 $10'$ of frame 12 is another pair of seats 120 $120'$, which are adapted to receive a bolt 33, which is passed through the hubs $36'$ $37'$ of a pair of compound spur-gear and crown or pin gear sectors, (designated in a general way by 34 and 35,) the spur-toothed sectors 36 and 37 projecting from their hubs $36'$ and $37'$ in a forward direction and the crown or pin toothed sectors from said hubs in a downward and rearward direction, the two hubs abutting, as shown in Fig. 8, the sectors being separated by a short space and the spur-toothed sectors 36 and 37 being in engagement with the racks 28 and 31 above described.

To permit the reciprocations of the hand-lever in a plane at right angles to the plane in which it rocks about the axis of the shaft 14, top and bottom clearance of the rack and sector teeth is necessary. This clearance must be at least equal to the versed sine of the arc of the sector pitch-circle which is subtended by the lengthwise mid-line of the hand-lever drawn through the points of intersection of the pitch-circle of the sector and the axis of reciprocation of the lever when the lever stands at one extreme of its reciprocatory movement. Suitable forms of teeth having slightly-undercurved flanks to afford this clearance are illustrated in Figs. 29 and 31, in which one rack and sector are shown in full lines in the mid-position of the lever and are dotted in extreme positions of reciprocation at each side of said mid-position. To obtain the needful clearance for the tops of the rack and sector teeth, the addendum or projection of the teeth beyond the pitch-lines is reduced somewhat below ordinary practice; but the racks and sectors will operate with only the usual side clearance given to the teeth of such gearing, and the lever can, as is shown by Fig. 31, make the extent of vibration indicated without causing rotative movement of the sectors.

Figure 7:
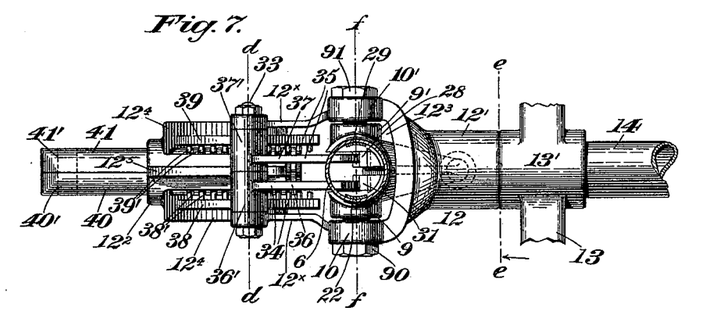
Fig. 7 is a plan view of the lower part of the movement with the tubular lever-arm in section.

The crown or pin teeth $38'$ $39'$ project laterally from the sectors 38 and 39, as shown in Figs. 1, 7, and 8, and are in engagement with parti-cylindrical racks 40 and 41, respectively, arranged within the tubular bearing $12^2$ of casing or frame 12, with their flat sides in contact, as shown in said Figs. 1, 7, and 8. Each rack 40 and 41 is provided with an eye $40'$ $41'$, respectively, to which rods or links 42 and 43, respectively, may be connected, said rods or links being adapted to be connected to the parts of the machine it is desired independently to operate by them.

It will be observed that the bolt 33, upon which the hubs $36'$ and $37'$ of the compound sectors are mounted for swinging movement, is in line with the axis of the compound lever 5 and that the pitch-lines of the teeth of the racks 28 and 31 intersect with said axis, on which the compound lever rocks backward and forward. Hence the toothed sectors will not be actuated by any movement of said lever, since each rack will rock on the point of intersection of the axis of the lever and the pitch-lines of the independent racks without imparting any movement to the sector in engagement therewith. When it is desired, however, to move either rack 40 or 41 backward or forward independently of each other, the thumb or finger actuated disk 17 or 19 desired is turned, and this action through the connections described will actuate the rack 28 or 31 longitudinally, cause the teeth thereof to move the spur-toothed portion of the sector, and cause the crown-gear part of said sector to impart motion to the rack. Other gearing may, however, be substituted for that shown, the invention not being limited to the particular gearing described.

As before stated, the compound lever is mounted for swinging movement in arcs at right angles to each other, and as the teeth of each rack are on a parti-cylindrical surface it follows that when the lever is swung laterally back and forth to rock the rod or bar 14, carried in the bearing 13' of the frame, the crown or pin teeth carried by the compound sectors will simply slide over the curved surfaces of the racks and will not actuate said racks.

While the use of my invention is not limited to any particular kind of machine, it may be advantageously employed in what are known as "mechanical" wagons or automobiles, in which case the rod or tube 14 may be connected with the usual steering mechanism, so that when the lever 5 is rocked laterally it will rock with the casing 12, and tube or shaft 14 will also be rocked, the latter being connected by the usual lever-and-link connections with the steering-wheels of the vehicle, so that when the lever is rocked to the right the vehicle will swerve in that direction, and when the lever is rocked to the left the vehicle will also swerve to the left. Rod or link 15' may also be connected with the clutch mechanism of the motor-vehicle, so that when the lever is swung forward in an arc at right angles to its axis 90 91 a clutch will be shifted to engage with the gearing and drive the vehicle forward. When swung to an intermediate position, the clutch will be thrown out of engagement with both the forward driving and reversing gearing, and the driving of the vehicle in either direction will be arrested, and when swung on its axis fully to the rear the motion will be reversed and the vehicle will be driven backward.

The small thumb or finger actuated disk 19 may, through the intermediate devices described, be connected with the devices for regulating the supply of fuel to the motor, and the similarly-formed disk 17 may be employed to advance or retard the time at which the charge firing or igniting devices are operated, so that by the use of my one single lever only the vehicle will be under perfect control as regards all of its functions.

As will readily be seen, if my invention should be employed in connection with an automobile or mechanical wagon one hand only of the operator is needfully used to keep said vehicle under perfect control, and this is a highly important condition, because if there were more than one hand-lever to be operated in an emergency mistakes in lever selection might follow, and, as a matter of fact, many lives have already been lost in the operation of motor-vehicles by the improper selection and manipulation of a lever in time of danger.

All movements of the compound lever described are easily made and are in the natural directions, since if the device is employed with a motor-vehicle to go forward the hand-lever will be pushed forward. To stop or go backward, the hand-lever will be pulled backward—the instinctive motion in case of danger ahead. To swerve to the right, the hand-lever is moved to the right, and to swerve to the left said lever is moved to the left. It is distinctly to be understood, however, that my invention is not limited to motor-vehicles, which are merely mentioned to give one of the many advantageous uses to which it may be applied.

Many changes may be made in the details of the parts, and the invention is not limited to the specific devices described; nor is it limited to any particular form of gearing, nor to multiple devices carried by the lever and connected to a series of racks, for in some instances one set of such devices may be employed with advantage and the other set omitted.

Having described my invention, what I claim is—

1. In a mechanical movement, the combination, with a frame, of a casing mounted for swinging movement therein; a shaft actuated by said casing; a lever pivoted to the casing and also adapted to rock the same; devices carried by said lever; means for actuating said devices independently of the movement of the lever; and mechanism actuated by said devices.

2. In a mechanical movement, the combination, with a lever mounted for movement in arcs at an angle to each other, of gearing carried by the lever; means for actuating said gearing; a sector actuated by said gearing; and a slide, the movement of which is controlled by the sector.

3. In a mechanical movement, the combination, with a casing mounted for rocking movement, of a lever mounted for backward and forward movements longitudinally of said casing and so connected thereto that when it is moved in certain directions it will actuate the casing; gearing carried by the lever; means under the control of the hand of the operator for actuating said gearing; a sector actuated by said gearing; and a slide controlled by the sector.

4. In a mechanical movement, the combination, with a frame mounted for reciprocatory movement, of a shaft actuated by the frame; a lever pivoted in and adapted to reciprocate the frame; means actuated by the lever as it is moved back and forth on its pivot; a rack carried by the lever; means for actuating said rack; gearing controlled by the rack; and a device actuated by said gearing.

5. The combination, with a frame, of a lever pivoted to said frame; gearing carried by the lever; means for actuating said gearing; gearing carried by the frame and with which the gearing carried by the lever is in engagement; and movable connections operated by the gearing carried by the frame.

6. The combination, with a frame mounted for swinging movement, of a lever for actuating said frame; means for pivoting said lever to the frame so that it may be moved back and forth thereon; means connected to and actuated by the lever as it is moved back and forth; a rack carried by the lever; means for actuating said rack; and gearing in engagement with said rack.

7. The combination, with a casing having a tubular end, of a lever pivoted to said casing; a rod or link actuated directly by said lever; a machine-frame; a shaft mounted for rocking movement in the machine-frame and secured to the tubular end of the casing; devices carried by the lever; and gearing carried by the casing and actuated by said devices.

8. The combination, with a machine-frame, of a casing having tubular ends; a shaft secured in one of said ends and journaled for rocking movement in the machine-frame; a lever pivoted in and extending through said casing; a universal joint; a rod or link connected to the lever by said joint; gearing carried by the lever; means for actuating said gearing; and a slide movable in the other tubular end of the frame and controlled by said gearing.

9. In a mechanical movement, the combination, with a frame having a tubular bearing, of a lever movably mounted on said frame; gearing carried by the frame; a slide mounted in said tubular bearing and connected with the gearing; and a device carried by the lever for controlling the movement of said slide.

10. In a mechanical movement, the combination, with a machine-frame, of a casing mounted for reciprocatory movement in said frame; a slide in said casing; a lever pivoted to said casing; a rack carried by said lever; a nut connected to the rack; a screw for actuating the nut; and gearing connecting said rack with the slide.

11. In a mechanical movement, the combination, with a frame having a tubular end, of a shaft secured in said end and journaled in a bearing of the machine-frame; a lever pivoted to said frame and adapted to rock the same transversely and to be moved back and forth on its pivot; means connected to said lever and adapted to actuate a rod or link when the lever is swung on its pivot; gearing carried by the frame; means carried by the lever for actuating said gearing; and a slide movable on the frame and in engagement with said gearing.

12. In a mechanical movement, the combination, with a hollow frame, of a tubular lever pivoted between the sides of said frame; gearing carried by the frame; and means located within the lever for actuating said gearing.

13. In a mechanical movement, the combination, with a casing having tubular ends, of a shaft secured in one of the ends of said casing and journaled in a bearing of a machine-frame; a slide mounted in the other end of said casing; means for rocking the casing and thereby the shaft; and means for actuating the slide.

14. A mechanical movement comprising a movably-mounted hollow frame; a lever pivoted to said frame and extending beyond the same; a device connected to one end of said lever and adapted to be actuated thereby when the lever is turned on its pivot; gearing carried by the frame; and devices carried by the lever for actuating said gearing.

15. A mechanical movement comprising a frame having a tubular bearing; a rack mounted in said bearing; gearing for actuating said rack; a lever; and devices carried by the lever for actuating said gearing.

16. A mechanical movement comprising a frame mounted for rocking movement; a lever pivoted to said frame and adapted to rock the same, and also having an independent movement on its pivot; a device connected to and actuated by said lever as it is swung back and forth; a slide carried by the frame; gearing for reciprocating the slide; and independent means carried by the lever for actuating said gearing.

17. A mechanical movement comprising a frame mounted for swinging movement; a lever pivoted to said frame, said lever having an extension; a shaft having a threaded portion mounted within said lever; a nut also mounted within the lever and in engagement with the thread of the shaft; means for actuating the shaft and thereby the nut; a rack connected with the nut; gearing actuated by said rack; and a rod having a bearing shaped to receive the extension of the lever.

18. A mechanical movement comprising a frame; a tubular lever; a threaded shaft, and a nut in engagement with said shaft, both shaft and nut being located within the lever; a rack mounted for movement in said lever; a connector between the rack and nut; a sector in engagement with the rack; and a slide having rack-teeth and controlled by said sector.

19. A mechanical movement comprising a frame; a tubular lever; threaded shafts within the lever; nuts with which said shafts engage also disposed therein; racks carried within the lever; connectors between the racks and nuts; gearing actuated by the racks; and means for independently actuating the threaded shafts.

20. A mechanical movement comprising a casing; racks disposed side by side in said casing; sets of gearing for independently actuating said racks; and means for independently actuating said sets of gearing.

21. A mechanical movement comprising a casing having a tubular bearing; racks disposed side by side in said bearing; sets of gearing for independently actuating said racks; a tubular lever connected to the casing; and independent mechanisms located within the lever for actuating the sets of gearing.

22. A mechanical movement comprising a machine-frame; a casing having tubular ends; a shaft secured in one of said ends and journaled in a bearing of said frame; a lever pivoted within the casing and having a depending portion with a rounded tip; a rod or link actuated by said tip as the lever is swung back and forth on its pivot; a slide mounted in the other tubular end of the casing; means for actuating said slide; and a device carried by the lever for operating the slide-actuating means.

23. A mechanical movement comprising a casing mounted for rocking movement in a frame; a lever pivoted between the sides of said casing and having a ball-shaped tip; a device having a seat for the tip and adapted to be reciprocated as the lever is swung back and forth on its pivot; gearing carried by the lever; and mechanism actuated by said gearing.

24. The combination, with a casing mounted for rocking movement in a frame, of a lever pivoted to said casing and adapted to rock the same; a device connected to and actuated by said lever as it is swung on its axis; gearing carried by the lever; gearing mounted for rocking movement in the casing; and a slide actuated by said gearing.

25. The combination, with a casing, of a tubular lever connected thereto; a slide mounted within the casing; gearing carried by the casing for actuating the slide; and means carried by the lever for actuating said gearing.

26. The combination, with a casing, of a tubular lever pivoted to said casing; means for supporting the casing in a machine-frame so that it may rock in a bearing of said frame; a device actuated by the lever as it is swung back and forth; a slide having parti-circular rack-teeth mounted in the casing; gearing in engagement with said rack-teeth; and means carried by the lever for operating said gearing.

27. A mechanical movement comprising a casing; racks mounted in said casing and arranged for independent movement therein, each of said racks having rounded teeth; gearing in engagement with said racks and adapted to be swung around without actuating the same; means for supporting the casing for rocking movement in a machine-frame; a lever; and means carried by the lever for actuating the rack-operating gearing.

28. The combination, with a hollow casing supported for rocking movement in the frame of a machine, of a tubular lever pivoted between the sides of said casing and having a depending portion extending through the casing; a device actuated by the lever as it is swung back and forth on its pivot; gearing carried by the casing; a rack carried by the lever and in engagement with said gearing; and means for actuating the rack.

29. A mechanical movement comprising a casing having seats; and mounted for rocking movement in a frame; a shaft attached to and movable with the casing; a lever pivoted on journals mounted in said seats, and having a depending portion, said lever being adapted to rock the casing and thereby actuate the shaft; and a device connected to the depending portion of the lever and adapted to be reciprocated as said lever swings back and forth on its pivot.

30. A mechanical movement comprising a casing; a sector carried thereby; means for supporting the casing in a machine-frame for rocking movement in said frame; a tubular lever carried by and adapted to rock said casing; a rack within the lever and in engagement with the sector; means for actuating the rack; and a slide controlled by the sector.

31. A mechanical movement comprising a casing; a toothed sector journaled therein; means for supporting the casing in a machine-frame for rocking movement in said frame; a tubular lever carried by and adapted to rock said casing; a rack within the casing; a threaded shaft and nut; a connector between the nut and rack; means for actuating the threaded shaft; a rack having a rounded surface; and a crown-gear controlled by the sector and adapted to actuate said rack.

32. A mechanical movement comprising a hollow casing; a compound sector having spur-geared and crown-geared portions pivoted in the casing; a rack actuated by the crown-geared part of the sector; a lever connected to the casing; a rack carried by the lever and in engagement with a part of the compound sector; and means carried by the lever for actuating said rack.

33. In a mechanical movement, the combination, with a casing mounted for rocking motion in a machine-frame, of means for rocking said casing; a parti-cylindrical rack carried by said casing; and gearing in engagement with said rack and adapted to move around without actuating the rack when the casing is rocked in either direction.

34. In a mechanical movement, the combination, with a casing mounted for rocking motion in a machine-frame, of a lever for rocking said casing; a parti-cylindrical rack mounted within the casing; and gearing for actuating said rack, so constructed that on a rocking movement of the casing said gearing will slide over without operating the rack.

35. In a mechanical movement, the combination, with a hollow casing mounted for rocking motion in the machine-frame, of a lever pivoted to said casing and adapted to swing back and forth thereon; a rack carried by said lever; a sector pivoted in the casing and in engagement with the rack; a slide carried by the casing and controlled by said sector; a device actuated by the lever as it is swung back and forth on its pivot; and means carried by the lever for actuating the sector.

36. In a mechanical movement, the combination, with a casing, of a lever pivoted therein; a sector mounted for swinging movement on an axis in line with the axis of said lever; a rack, the pitch-line of the teeth of which intersects the axis on which the lever moves back and forth, whereby any movement of said lever in such directions will cause the rack to rock on the point of intersection of the axis of the lever and the pitch-line of said rack without imparting movement to the sector; a slide mounted in the casing; means controlled by the sector for actuating said slide; and means carried by the lever for independently actuating the sector when it is desired to operate the slide.

37. The combination, with a casing, of multiple racks mounted in said casing; compound sectors having crown or pin teeth for actuating said racks; a lever mounted on the casing; and means carried by the lever for actuating the sectors.

38. In a mechanical movement, the combination, with a casing mounted for rocking movement in a machine-frame, of a lever pivoted to said casing; a device connected to said lever and adapted to be moved back and forth as the lever is rocked on its pivot; a compound sector having spur and pin or crown toothed portions; a rack in engagement with said pin or crown toothed portion of the sector; a rack carrried by the lever and in engagement with the spur-toothed part of said sector; and means also carried by the lever for actuating said rack.

39. In a mechanical movement, the combination, with a casing mounted for rocking movement in a machine-frame, of a toothed sector mounted in the casing on an axis in line with the axis of the lever; a rack carried by the lever, the pitch-lines of the teeth of the rack and sector intersecting the axis of said lever; means carried by the lever for actuating said rack; and a slide controlled by the sector when it is turned by the rack.

40. In a mechanical movement, the combination, with a casing mounted for swinging movement in a machine-frame, of a lever pivoted in said casing and having a depending portion; a rod or link connected with said depending portion and adapted to be connected to a part of a machine; a rack carried by the lever; a threaded connection for operating said rack; means under the control of the hand of the operator for actuating said threaded connection; a toothed sector in engagement with said rack; a pin or crown tooth sector operated by the first-named sector; and a rack, the teeth of which are in engagement with the pin or crown teeth of said last-named sector.

41. In a mechanical movement, the combination, with a casing mounted for movement in a machine-frame, of a sector pivoted in said casing; a lever also pivoted in the casing; a rack carried by the lever, the teeth of the rack and sector being so constructed that the lever may be swung back and forth without actuating said sector; means for actuating the rack; and a slide carried by the casing, the movement of said slide being controlled by the sector.

42. In a mechanical movement, the combination, with a casing; of a shaft mounted in a bearing of the machine-frame and secured to said casing; a lever for rocking said casing and shaft; a rack carried by the casing; gearing for actuating said rack; a rack carried by the lever and in engagement with a part of said gearing; a connector attached to the rack; a nut attached to said connector; a threaded shaft in engagement with said nut; and a wheel or disk for actuating said threaded shaft.

43. In a mechanical movement, the combination, with a frame, of a tubular lever projecting from said frame; a rack mounted within the lever; a compound sector having spur-toothed and crown-toothed sections; a rack carried by the frame and in engagement with the crown-toothed section; a bar or plate connected at one end to the rack within the lever; a nut within the lever connected to said bar or plate; and means for actuating said nut.

44. In a mechanical movement, the combination, with a frame, of a tubular lever projecting from said frame; a compound sector journaled on the frame and having spur and crown toothed sections; a rack carried by the lever and in engagement with the spur-toothed part of the sector; a nut carried by the lever; a detachable connector between the nut and rack; and means carried by the lever for actuating said nut.

45. In a mechanical movement, the combination, with a frame, of a rack mounted for sliding movement in said frame; a compound sector journaled on the frame, a part of which is in engagement with said rack; a handle projecting from the frame; a rack carried by the handle and in engagement with the other part of said sector; a nut; a threaded shaft for actuating said nut; and a detachable connector between the nut and the rack carried by the handle.

46. In a mechanical movement, the combination with a frame, of a slide mounted for reciprocation in said frame, gearing for operating said slide; a handle projecting from the frame; a device carried by the handle and adapted to actuate the slide-operating gearing; a connector attached to said device; and means carried by the handle for actuating said connector.

47. In a mechanical movement, the combination, with a frame, of a tubular handle projecting from said frame; a slide mounted for reciprocation on the frame; gearing for operating said slide; a parti-cylindrical rack-carrier located within the handle; a rack secured to the rack-carrier and in engagement with the slide-operating gearing; a concave connector secured to said rack-carrier at one end;

a nut secured to said concave connector at its other end; and means located within the handle for actuating said nut.

48. In a mechanical movement, the combination, with a casing mounted for reciprocatory movement, of a lever pivoted to said casing; gearing carried by the lever and gearing carried by the casing, the teeth of such gearing being so constructed that when the lever is moved back and forth they will rock upon each other without actuating said gearing; means carried by the lever for actuating said gearing; a device actuated by the gearing carried by the casing; and a device actuated by the lever as it is swung on its pivot.

49. In a mechanical movement, the combination, with a casing, of gearing carried by said casing; a lever pivoted to the casing; a rack mounted for sliding movement on the lever, the teeth of said gearing and rack being so constructed that when the lever is swung on its pivot they will rock upon each other without actuating the gearing carried by the casing; means for actuating the rack; and a device actuated by the lever as it is swung back and forth upon its pivot.

50. In a mechanical movement, the combination, with a frame or casing, of a tubular lever pivoted to said frame or casing; nuts and threaded shafts mounted within said lever; connectors attached to the nuts at one end; racks to which the connectors are attached at their other ends; a guide block or chock for separating the racks; hand-wheels for operating the threaded shafts; sectors in engagement with the racks; and slides controlled by said sectors.

51. In a mechanical movement, the combination, with a frame or casing, of a tubular lever projecting therefrom; a slide mounted in the casing; gearing for actuating said slide; a parti-cylindrical rack-carrier located in the lever and having a seat; a concave connector fitted in said seat; and means carried by the lever for actuating said connector.

52. In a mechanical movement, the combination, with a frame or casing, of a slide mounted therein; gearing for operating said slide; a lever secured to the frame; a rack-carrier having a seat integral therewith; a rack secured in said seat and in engagement with the slide-operating gearing; and means for actuating said rack.

53. In a mechanical movement, the combination, with a frame, of gearing; a rack-carrier having a bar projecting therefrom; a rack seated in said bar and in engagement with said gearing; and means for actuating the rack-carrier.

54. In a mechanical movement, the combination, with a frame, of a tubular lever secured to said frame; gearing carried by the frame; a rack-carrier having integral therewith a bar provided with a seat, said rack-carrier having a curved surface on one side to fit within the lever; and means located within the lever for operating said rack-carrier.

55. The combination, with a rocking frame, of gearing carried by said frame; a parti-cylindrical rack mounted in said frame; a lever for rocking the frame, the gearing slipping over the rack; and means carried by the lever for actuating said gearing.

56. In a mechanical movement, the combination, with a frame, of racks mounted in said frame; gearing for actuating the racks; a lever projecting from the frame; and means carried by said lever for actuating said gearing.

57. In a mechanical movement, the combination, with a frame mounted for rocking movement, of parti-cylindrical racks located in said frame; gearing for operating said racks and constructed to slip over without actuating the racks when the frame is rocked; a lever projecting from the frame; and mechanism carried by the lever for operating the rack-actuating gearing when it is desired to move said racks.

58. In a mechanical movement, the combination, with a frame mounted for rocking movement, of two parti-cylindrical racks arranged with their flat sides in contact in a bearing of said frame; and means carried by the frame for independently actuating said racks.

59. In a mechanical movement, the combination, with a frame having a tubular bearing, of two parti-cylindrical racks arranged with their flat sides in contact in said bearing; sets of gearing carried by the frame and in engagement with said racks; and means for independently actuating said sets of gearing.

60. In a mechanical movement, the combination, with a frame mounted for rocking movement and having a tubular bearing, of two parti-cylindrical racks arranged with their flat sides in contact in said bearing; crown-gears in engagement with, and adapted when the frame is rocked to slip over without actuating, the racks; a lever for rocking the frame; and independent mechanisms carried by said lever for actuating the gearing in engagement with said racks.

61. In a mechanical movement, the combination, with a frame mounted for rocking movement, of a parti-cylindrical rack located in a bearing of said frame; a crown-tooth sector in engagement with said rack; a spur-tooth sector connected to and actuating said crown-tooth sector; a lever projecting from the frame; a rack carried by said lever and in engagement with said spur-tooth sector; and means also carried by the lever for actuating the rack.

62. In a mechanical movement, the combination, with a frame mounted for rocking movement and having a tubular bearing; of two parti-cylindrical racks arranged with their flat sides in contact within said bearing; crown-tooth sectors in engagement with the teeth of said racks, spur-tooth sectors integral with, and projecting at an angle from, said crown-tooth sectors; a lever projecting from the frame; racks carried by the lever in engagement with the spur-tooth sectors; and means also carried by the lever for independently actuating said racks.

63. In a mechanical movement, the combination, with a frame mounted for rocking movement, of a parti-cylindrical rack mounted for reciprocation in said frame; a crown-tooth sector in engagement with the teeth of said rack; a spur-tooth sector integral with, and projecting from, said crown-tooth sector; a tubular lever projecting from the frame; a rack within said lever; and means carried by the lever for actuating said rack.

64. In a mechanical movement, the combination, with a frame mounted for rocking motion and having a tubular bearing at one end, of a parti-cylindrical rack located in said bearing; a crown-tooth sector in engagement with the teeth of said rack; a spur-tooth sector for actuating said crown-tooth sector; a tubular lever projecting from the frame; a rack mounted for reciprocation within said lever and in engagement with the teeth of said spur-tooth sector; a connector detachably attached to said rack and shaped at one side to fit the contour of the lever; a nut to which the said sector is detachably connected; a shaft having a threaded section engaging said nut; and a hand-wheel for actuating said shaft.

65. In a mechanical movement, the combination, with a frame mounted for rocking motion and having a tubular bearing, of parti-cylindrical racks arranged with their flat sides in contact in said tubular bearing; crown-tooth sectors in engagement with said racks; spur-tooth sectors for actuating said crown-tooth sectors; a tubular lever projecting from the frame; racks carried by and guided in said lever; concave connectors detachably applied to said racks; nuts located one above the other in the lever and to which said connectors are detachably attached; shafts having threaded sections in engagement with said nuts; and hand-wheels attached to said shafts.

66. In a mechanical movement, the combination, with a frame, of a rack mounted for sliding movement in said frame; gearing carried by the frame for actuating said rack; a tubular lever projecting from the frame; a parti-cylindrical rack-carrier mounted within said tubular lever; a rack fitted in a seat of said rack-carrier; a concave connector having a reduced portion fitted in the groove of the rack-carrier; a nut located in the tubular lever and having a groove to receive another reduced portion of said connector; a shaft having a screw-threaded portion in engagement with said nut, said shaft extending to the exterior of the tubular lever; and a hand-wheel carried by said shaft.

67. In a mechanical movement, the combination, with a frame, of a rack mounted for sliding movement in said frame; gearing for actuating said rack; a tubular lever projecting from said frame; a parti-cylindrical rack-carrier mounted within said tubular lever; a rack attached to said carrier; a concave connector having a reduced portion fitted in the seat of the rack-carrier, and said connector extending vertically within the tubular lever; a nut having a seat to receive another reduced portion of said connector; a shaft having an enlarged portion formed with a screw-thread in engagement with said nut, said shaft extending through the tubular lever; and a hand-wheel attached to said shaft.

68. In a mechanical movement, the combination, with a frame having a tubular bearing at one end, of two parti-cylindrical racks mounted for independent movement within said bearing; sets of gearing for independently actuating each of said racks; a tubular lever connected to the frame; parti-cylindrical rack-carriers mounted for independent movement within said lever; racks attached to said carriers and adapted to actuate said gearing; concave connectors located in seats of the rack-carriers at diametrically opposite points in said lever; nuts mounted in the tubular lever and having seats for the reception of said connectors; screw-threaded shafts in engagement with said nuts; and means for actuating said shaft.

69. In a mechanical movement, the combination, with a frame having a bearing, of racks mounted for independent movement in said bearing; independent sets of gearing for actuating said racks; a tubular lever projecting from the frame; racks mounted within said lever; connectors seated in said racks at their lower ends and extending vertically within the lever; a nut having a seat for receiving one of said connectors, and another seat for permitting the free movement of the other connector; a shaft having an enlarged threaded portion in engagement with said nut; a nut located above the first-named nut within the tubular lever and having a seat to receive the upper end of a connector; a tubular shaft having an enlarged threaded portion in engagement with said nut, said shaft surrounding the shaft connected to the other nut; and hand-wheels located one above the other on the exterior of the lever and connected, respectively, to said shafts.

HORACE L. ARNOLD.

Witnesses:
FRED. J. DOLE,
WM. H. BLODGETT.